US010849262B2

(12) United States Patent
Kinkead et al.

(10) Patent No.: US 10,849,262 B2
(45) Date of Patent: Dec. 1, 2020

(54) METHODS AND APPARATUS FOR AERATING TURF

(71) Applicant: TURFCO MANUFACTURING, INC., Blaine, MN (US)

(72) Inventors: George B. Kinkead, Mendota Heights, MN (US); Kenneth W. Sylvester, East Bethel, MN (US); Thomas J. Fiske, Brooklyn Park, MN (US); Terrance Bondeson, Woodbury, MN (US)

(73) Assignee: TURFCO MANUFACTURING, INC., Blaine, MI (US)

( * ) Notice: Subject to any disclaimer, the term of this patent is extended or adjusted under 35 U.S.C. 154(b) by 266 days.

(21) Appl. No.: 15/788,669

(22) Filed: Oct. 19, 2017

(65) Prior Publication Data

US 2018/0103571 A1 Apr. 19, 2018

Related U.S. Application Data

(60) Provisional application No. 62/410,007, filed on Oct. 19, 2016.

(51) Int. Cl.
*A01B 45/02* (2006.01)
*A01B 63/00* (2006.01)

(52) U.S. Cl.
CPC .......... *A01B 45/023* (2013.01); *A01B 63/008* (2013.01)

(58) Field of Classification Search
CPC ....... A01B 45/00; A01B 45/02; A01B 45/026; A01B 63/008
See application file for complete search history.

(56) References Cited

U.S. PATENT DOCUMENTS 1,157,670 A 10/1915 Boswell
1,778,334 A 10/1930 Pedersen
(Continued)

FOREIGN PATENT DOCUMENTS

AU 256472 5/1963
EP 0140989 5/1985
(Continued)

OTHER PUBLICATIONS

Plugr Walk Behind Power Aerators, web page, (5 pgs.)—no date—.
(Continued)

*Primary Examiner* — Jamie L McGowan
(74) *Attorney, Agent, or Firm* — Alan D. Kamrath; Mayer & Williams PC

(57) ABSTRACT

A turf aerator is configured with components that allow a user to set a desired turf aeration depth and then automatically adjust hydraulic pressure to produce a proper level of downward pressure into the ground in order to maintain consistent depth penetration with the tines. The turf aerator implements a depth control lever that is operatively connected to a switch that increases or decreases tine depth up or down. Since the desired tine depth is set and the hydraulic pressure is capable of puncturing the ground accordingly, portions of the ground that are relatively harder or softer are still properly penetrated due to the set level of depth. The turf aerator is also configured with a tine housing which shields drive chains from dirt and debris from the aerating, thereby increasing the life of the drive chains.

13 Claims, 5 Drawing Sheets

(56) References Cited

U.S. PATENT DOCUMENTS

| | | | |
|---|---|---|---|
| 1,807,182 A | 5/1931 | Stoner | |
| 2,205,997 A | 6/1940 | Wallace et al. | |
| 2,229,497 A | 1/1941 | Dontje | |
| 2,234,534 A | 3/1941 | Reno | |
| 2,244,099 A | 6/1941 | Chase | |
| 2,260,110 A | 10/1941 | Blohm | |
| 2,400,204 A | 5/1946 | Lindskog | |
| 2,649,061 A | 6/1953 | Hawkins et al. | |
| 2,675,750 A | 4/1954 | Boyer | |
| 2,750,859 A | 6/1956 | Smithburn | |
| 2,823,597 A | 2/1958 | Cadwallader | |
| 2,835,182 A | 5/1958 | Smithburn | |
| 2,888,994 A | 6/1959 | Hoff et al. | |
| 3,148,737 A * | 9/1964 | Lunsford | A01B 45/02 172/21 |
| 3,171,498 A | 3/1965 | Logan | |
| 3,429,378 A * | 2/1969 | Mascaro | A01B 45/023 172/22 |
| 3,504,748 A | 4/1970 | Croft | |
| 3,566,973 A * | 3/1971 | Blair | A01B 45/02 172/21 |
| 3,675,724 A | 7/1972 | Schneider | |
| 3,792,734 A | 2/1974 | Ellis et al. | |
| 4,089,387 A | 5/1978 | Cook | |
| 4,289,224 A | 9/1981 | Dobberpuhl | |
| 4,336,760 A | 6/1982 | Cohen et al. | |
| 4,438,873 A | 3/1984 | Kaercher, Jr. | |
| 4,476,938 A * | 10/1984 | McKay | A01B 45/02 172/22 |
| 4,550,783 A | 11/1985 | Hansen | |
| 4,601,163 A | 7/1986 | Trelford | |
| 4,645,012 A | 2/1987 | Hansen et al. | |
| 4,750,565 A | 6/1988 | Hansen et al. | |
| 4,753,298 A | 6/1988 | Hansen et al. | |
| 4,773,486 A | 9/1988 | Huber | |
| 4,776,404 A | 10/1988 | Rogers et al. | |
| 4,830,145 A | 5/1989 | Hansen | |
| 4,867,244 A | 9/1989 | Cozine et al. | |
| 4,881,602 A | 11/1989 | Hansen et al. | |
| 5,009,270 A | 4/1991 | Vangsgard | |
| 5,029,652 A | 7/1991 | Whitfield | |
| 5,036,655 A | 8/1991 | Holloway | |
| 5,119,880 A | 6/1992 | Zehrung, Jr. et al. | |
| 5,142,852 A | 9/1992 | Nelson | |
| 5,207,278 A | 5/1993 | Hatlen | |
| 5,209,306 A | 5/1993 | Whitfield | |
| 5,307,952 A | 5/1994 | Worrel et al. | |
| 5,307,965 A | 5/1994 | Worrel | |
| 5,398,767 A | 3/1995 | Warke | |
| 5,454,433 A | 10/1995 | Worrel et al. | |
| 5,460,229 A | 10/1995 | Mattis | |
| 5,478,104 A | 12/1995 | Worrel et al. | |
| 5,571,252 A | 11/1996 | Worrel et al. | |
| 5,586,604 A | 12/1996 | Postema | |
| 5,673,756 A | 10/1997 | Classen | |
| 5,680,903 A | 10/1997 | Oliver | |
| 5,794,708 A | 8/1998 | Brophy | |
| 5,802,994 A | 9/1998 | Kinkead et al. | |
| 5,823,269 A | 10/1998 | Leclerc | |
| 6,024,033 A | 2/2000 | Kinkead et al. | |
| 6,041,869 A | 3/2000 | Lewis et al. | |
| 6,058,860 A | 5/2000 | Kinkead et al. | |
| 6,102,129 A | 8/2000 | Classen | |
| 6,149,079 A | 11/2000 | Kinkead et al. | |
| 6,151,811 A | 11/2000 | Barreto | |
| 6,179,061 B1 | 1/2001 | Fiore | |
| 6,200,066 B1 | 3/2001 | Humphrey | |
| 6,241,025 B1 | 6/2001 | Myers et al. | |
| 6,273,197 B1 | 8/2001 | Marlow | |
| 6,415,872 B2 | 7/2002 | Myers et al. | |
| 6,684,960 B1 | 2/2004 | Ng | |
| 6,708,773 B1 | 3/2004 | Kinkead et al. | |
| 7,779,929 B2 | 8/2010 | Maas et al. | |
| 8,079,422 B2 | 12/2011 | Maas et al. | |
| 8,291,991 B1 | 10/2012 | Cook | |
| 8,590,632 B2 * | 11/2013 | Berglund | A01B 49/027 172/122 |
| 9,474,196 B2 | 10/2016 | Kinkead et al. | |
| 2003/0178207 A1 | 9/2003 | Lauer | |
| 2003/0201106 A1 | 10/2003 | Jessen | |
| 2004/0154811 A1 | 8/2004 | Kinkead et al. | |
| 2005/0006110 A1 | 1/2005 | Wessel | |
| 2005/0173134 A1* | 8/2005 | Maas | A01B 45/02 172/22 |
| 2006/0048952 A1 | 3/2006 | Classen | |
| 2008/0029278 A1* | 2/2008 | Wynings | A01B 45/02 172/22 |
| 2011/0203816 A1 | 8/2011 | Hurley | |
| 2013/0014965 A1* | 1/2013 | Barger | A01B 45/026 172/21 |
| 2015/0107863 A1* | 4/2015 | Bryant | A01B 76/00 172/21 |

FOREIGN PATENT DOCUMENTS

| | | |
|---|---|---|
| GB | 472443 | 9/1937 |
| GB | 1558467 | 1/1980 |
| GB | 2347400 | 9/2000 |

OTHER PUBLICATIONS

Billy Goat Industries—EZair Aerators, web page (2 pgs.)—no date—.

Classen Manufacturing, Inc., web page (2 pgs.)—no date—.

BlueBird International Products—Turf Care, web page (1 pg.)—no date—.

BlueBird Internation Products—Turf Care-424, web page (2 pgs.)—no date—.

\* cited by examiner

METHODS AND APPARATUS FOR AERATING TURF

CROSS-REFERENCE TO RELATED APPLICATIONS

The present non-provisional application claims benefit to U.S. Provisional Application No. 62/410,007 filed Oct. 19, 2016, the entire disclosure of which is hereby incorporated herein by reference.

BACKGROUND

Methods and apparatus for aerating turf are shown and described. The conception of a pair of tine shafts driven through a differential shaft in a turf aerator as taught in U.S. Pat. No. 6,708,773, which is hereby incorporated herein by reference, represented a major innovation in the turf field. In particular, the ability to operatively connect and clutch one or the other or both of the tine shafts, whether done mechanically, hydrostatically, or in other manners or combinations, allow the operator to make turns while the tines are still in contact with the turf. However, once turning was a possibility, operators desired further ability in directing the turf aerator during operation.

As an example, in an alternate approach by others to this innovation, outer tine assemblies were rotatably mounted at the two end portions of a single driven shaft including inner tine assemblies secured to the single driven shaft intermediate the outer tine assemblies. Although increasing turning ability relative to conventional turf aerators existing prior to U.S. Pat. No. 6,708,773, this alternate approach did not have the turning ability achieved by the turf aerator of U.S. Pat. No. 6,708,773. U.S. patent application Ser. No. 13/282,095 (U.S. Pat. No. 9,474,196), reflects another major innovation in the turf field, with U.S. patent application Ser. No. 13/282,095 also being incorporated herein by reference.

Rolling tine aerators aerate to a given depth based on the down pressure placed on the tines. Current riding aerating machines control depth by setting a fixed hydraulic pressure to produce a given down pressure. Thus, as soil conditions change on the lawn, the depth of tines will change. The user is constantly having to adjust hydraulic pressure to compensate for those changes in conditions on a lawn to get the proper down pressure and corresponding depth desired. Consistent depth is desired, so if the down pressure is too light on harder soil conditions, the tines will not penetrate to the desired depth, and if the down pressure is too heavy on softer soil conditions, the tines will penetrate past the desired depth, possibly hitting things such as tree roots, irrigation systems, etc. that are buried.

Current riding aerator machines raise and lower the tine shaft, while the housing that shields the tines remains fixed to the frame of the machine. Due to width constraints, this requires the drive chains for the tines to be inside the housing in between sets of tines, where dirt and debris from aerating can get into the chains and cause them to stretch and prematurely wear out.

Thus, a need for improvement in methods and apparatus for aerating exists in the field of turf management.

SUMMARY

This need and other problems in the field of turf management are solved by providing an apparatus for aerating turf.

A turf aerator is configured with components that provide a user with the ability to control and accordingly set a desired level of depth for tine penetration into the ground, which thereby automatically adjusts the necessary hydraulic pressure to reach the set level of depth. The user can use a depth control lever on the turf aerator in order to set the desired level of depth. The depth control lever may be operatively connected to an adjustable switch for which the user can adjust the positioning. A fixed switch may be positioned above the adjustable switch when the turf aerator is upright. The fixed switch can define the raised position of the hydraulic cylinder and the adjustable switch can control the lowered position of the hydraulic cylinder.

After the user sets the switch using the depth control lever to a desired level of depth, the retraction and elongation of the hydraulic cylinder is determined by the bounds between the adjusted switch and the fixed switch. For example, a trip may be positioned between the fixed switch and the adjustable switch, and the trip's position corresponds to the retraction and elongation of the hydraulic cylinder. Accordingly, during operation, the fixed switch defines the maximum retraction of the hydraulic cylinder and the adjustable switch defines the maximum elongation of the hydraulic cylinder. Advantageously, when the ground is respectively harder or softer during operation of the turf aerator, the tines may still penetrate to the set depth without the user having to specifically adjust hydraulic pressure. This way, consistent depth is reached regardless of the turf's density.

The turf aerator further employs drive chains that are utilized for gearing the tine assemblies and wheels for movement, in which the drive chains are positioned on an exterior of a tine housing in order to protect the drive chains from dirt and debris during the turf aeration. Positioning the drive chains such that they are protected from the turf aeration allows for an increased life of the drive chains, which thereby reduces cost for repairs and saves time for users.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
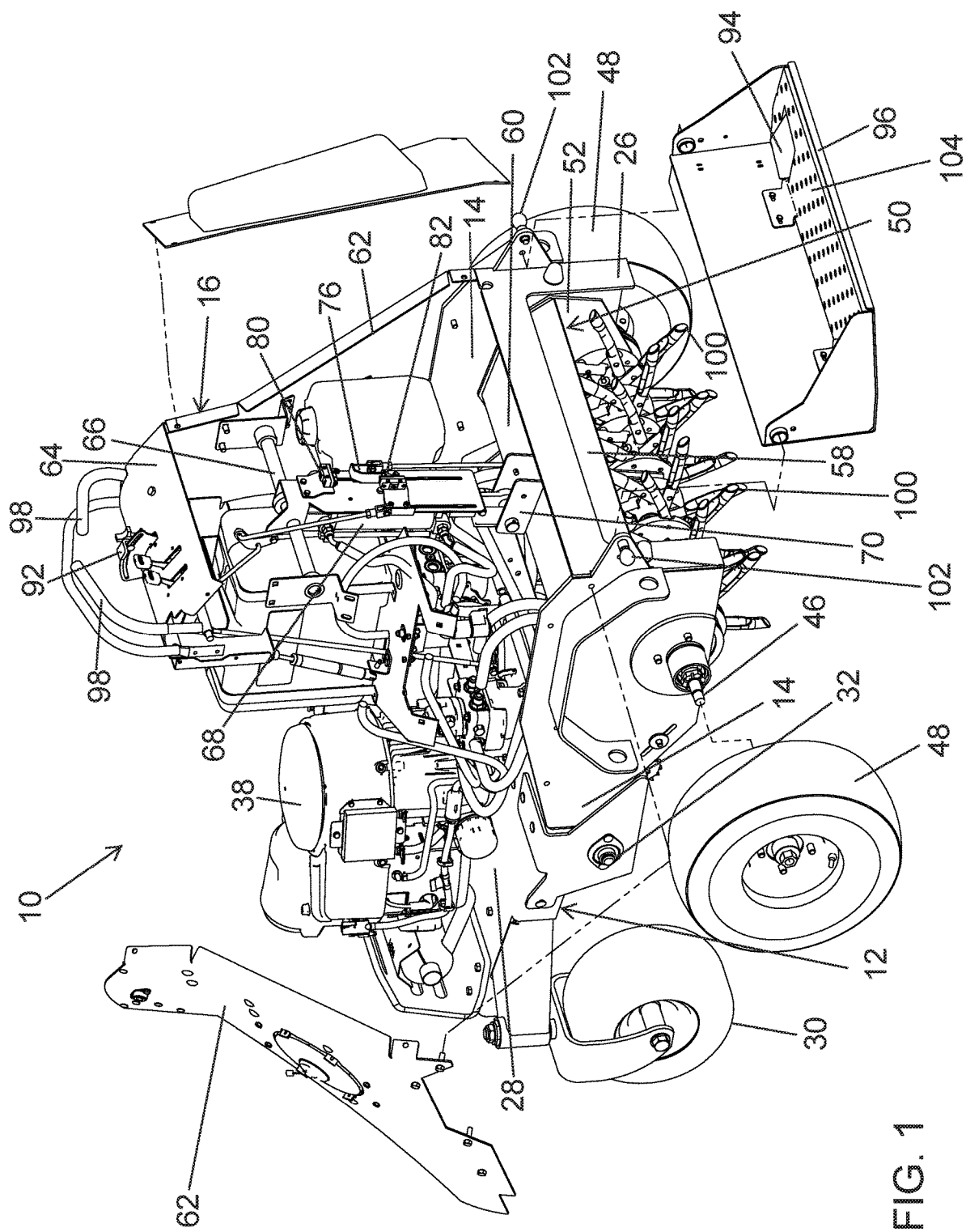
FIG. 1 shows an exploded, rear perspective view of an illustrative embodiment of an apparatus for aerating turf.

All figures are drawn for ease of explanation of the basic teachings only; the extensions of the figures with respect to number, position, relationship, and dimensions of the parts to form the illustrative embodiments will be explained or will be within one skilled in the art after the following description has been read and understood. Further, the exact dimensions and dimensional proportions to conform to specific force, weight, strength, and similar requirements will likewise be within one skilled in the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

Illustrative embodiments of an apparatus for aerating turf are shown in the drawings and generally designated 10. Generally, turf aerator 10 includes a chassis 12 including first and second side plates 14, front and back plates 24 and 26, respectively, extending between side plates 14, and a top plate 28 extending between side plates 14 and from front plate 24 towards, but spaced from, back plate 26. In the form shown, top plate 28 is generally an isosceles trapezoid. Chassis 12 is moveably supported on turf adjacent to front plate 24 by caster wheels 30, with caster wheels 30 located outwardly of side plates 14. Caster wheels 30 may protrude from each side which thereby provides additional stability to turf aerator 10.

A motor 38 is mounted to top plate 28 adjacent to front plate 24. Motor 38 is in driving connection to hydraulic pumps.

Figure 2:
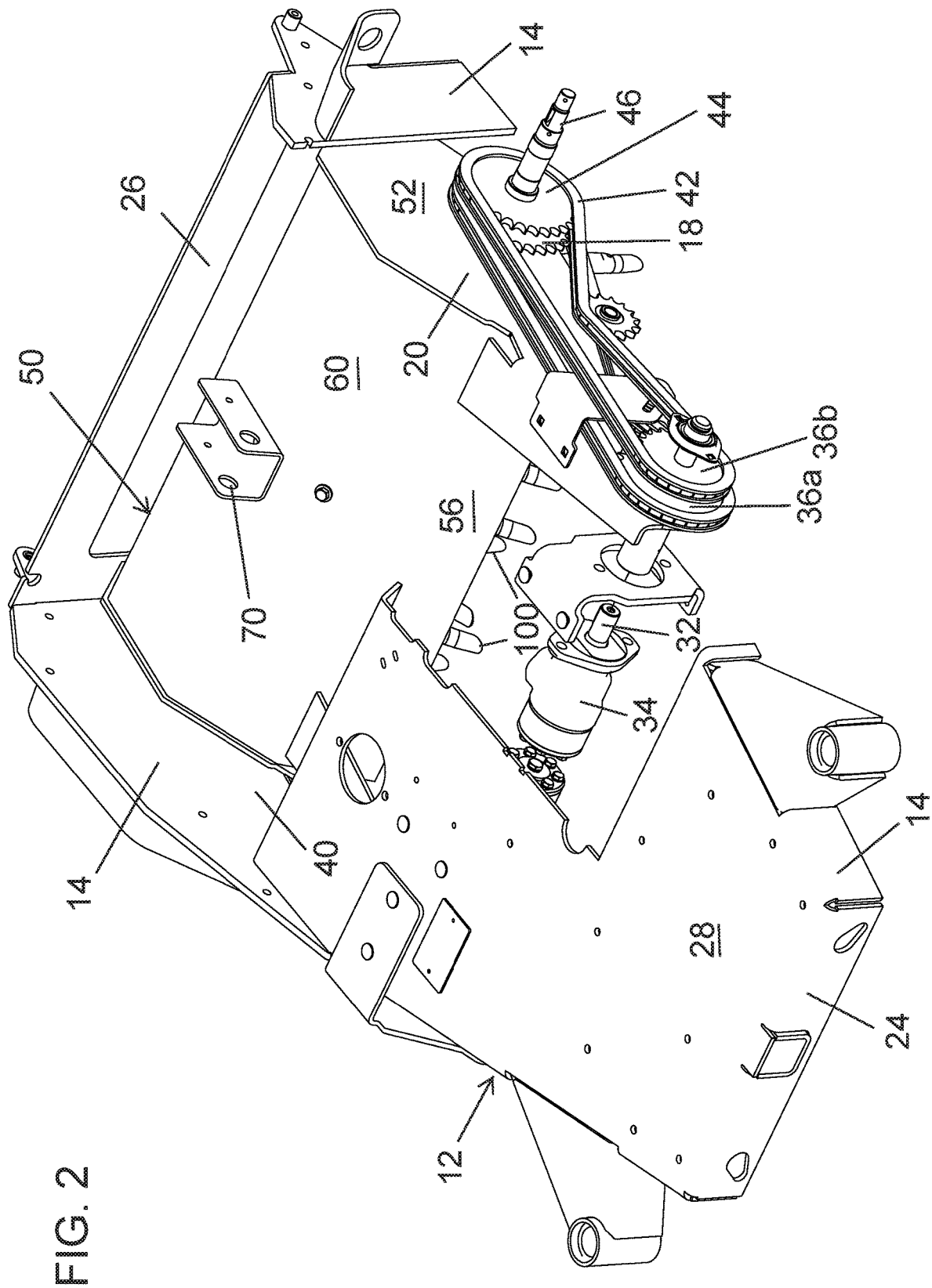
FIG. 2 shows a perspective view of some of the components of the aerating apparatus of FIG. 1, with portions broken away to show internal details.
Figure 3:
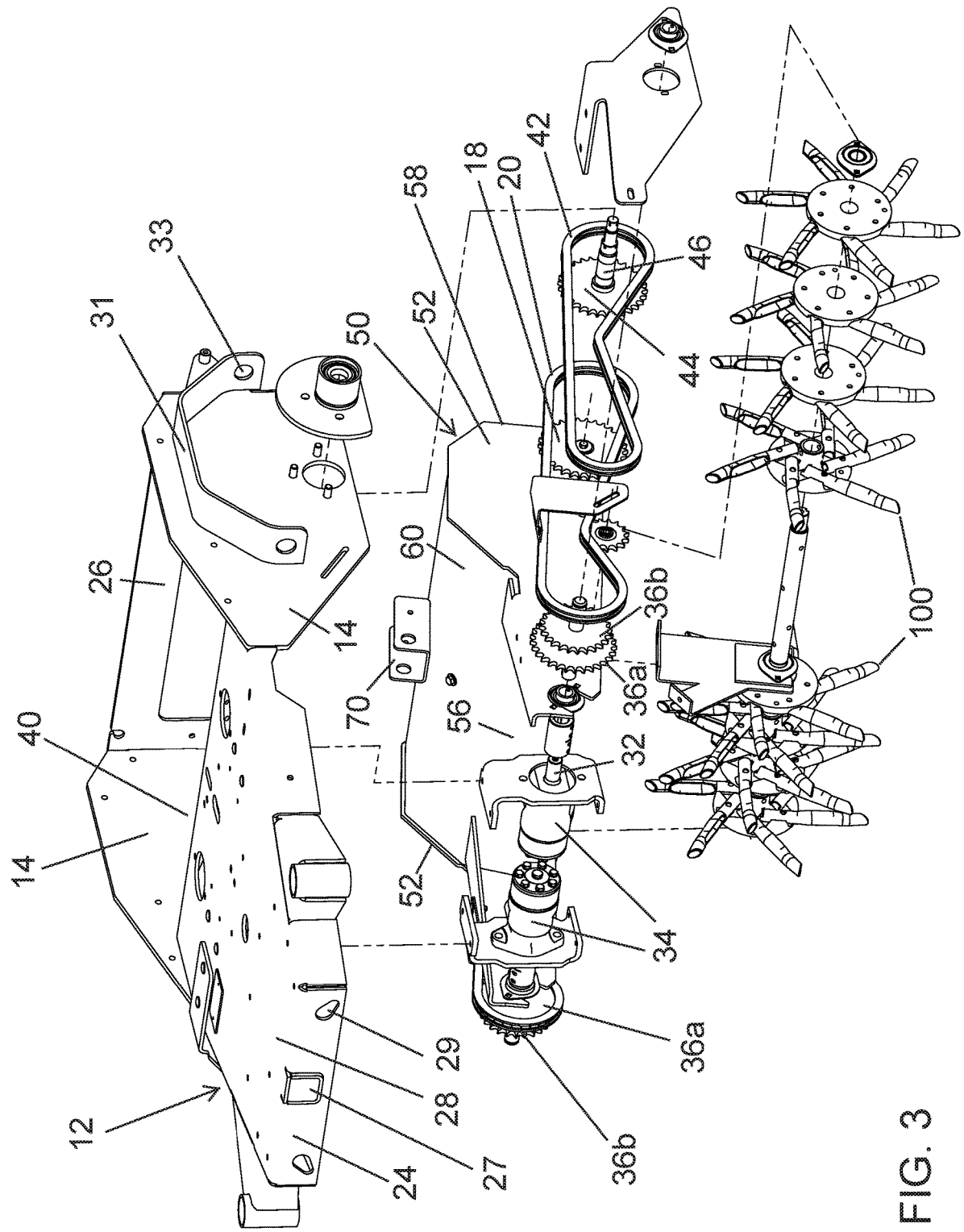
FIG. 3 shows an exploded perspective view of various components of the aerating apparatus of FIG. 2.

In the embodiments shown in FIGS. 2 and 3, a pair of tine assemblies 100 is driven at their outer ends by a sprocket 18 in gearing relation to a drive chain 20. Further, in the embodiments shown, tine assemblies 100 are each of the type shown and described in U.S. patent application Ser. No. 13/282,095 (U.S. Pat. No. 9,474,196), which is hereby incorporated herein by reference. All bearings on the tine shafts, wheels, casters, and jackshafts are sealed bearings and may not need to be greased by the user at given intervals. This saves the user time in maintenance, and also reduces the possibility that maintenance is forgotten which thereby leads to bearing failures and costly repairs for the user.

In the embodiments shown, chassis 12 of turf aerator 10 includes a rectangular opening 40 in top plate 28 between side plates 14 and spaced from front plate 24 and generally located over tine assemblies 100. A tine housing 50 is pivotably secured to chassis 12 and extends within opening 40 in chassis 12. Tine housing 50 includes first and second side sheets 52 located inwardly of side plates 14 of chassis 12. Further, front and back sheets 56 and 58 of tine housing 50 extend between side sheets 52 intermediate the front and back ends and at the back ends thereof respectively. Tine housing 50 further includes a top sheet 60 extending between front and back sheets 56 and 58 and extending between side sheets 52. Top sheet 60 and front and back sheets 56 and 58 extend generally perpendicular to side sheets 52. Tine assemblies 100 are rotatably mounted to tine housing 50 between side sheets 52 and front and back sheets 56 and 58 and under top sheet 60, with the outer ends and sprockets 18 of tine assemblies 100 located outside of side sheets 52. Although the word sheets are used to describe various components such as the top sheet 60 and side sheets 52, it should be understood that these components can likewise be considered support members in general or frames that form the overall shape of the components, and may not necessarily be manufactured as sheets of material.

The chassis 12 can also include a front attachment receiver 27 which can be used to secure the attachment 110 thereto. In this example, the front attachment receiver 27 forms a U-shaped channel which is or can be square or rectangle. Chassis 12 also includes holes 29, in this example shaped as a tear-drop for improved ease of use and functionality, which can be used for one or both purposes of securing the aerator turf machine for transport or for securing the attachment 110 thereto. In addition, the holes 33 on side fenders 31 can be used to better secure the turf aerator during transport. In this regard, the holes 33 can be referred to as tie-down holes in which a user can use to better secure the turf aerator during transportation. In the example depicted in FIG. 3, the front attachment receiver 27 is shown at least partially on front plate 24 and top plate 28, however, the attachment receiver can additionally or alternatively be positioned on one or the other as well. Additional U-shaped channels can also be used for additional support. Furthermore, although FIG. 3 depicts the holes 29 positioned on front plate 24, alternatively or additional holes can be positioned on top plate 28.

Turf aerator 10 further includes a pair of hydraulic motors 34 mounted to chassis 12 between opening 40 and front plate 24 and having output shafts 32 aligned with each other and extending generally perpendicular to side plates 14. Tine housing 50 is pivotably connected to chassis 12 by having the front ends of side sheets 52 rotatably coupled to output shafts 32 which are parallel to, but spaced from, the rotation axis of tine assemblies 100. Each output shaft 32 includes a sprocket 36a in gearing relation to drive chain 20 for driving the corresponding tine assembly 100. Each output shaft 32 further includes a sprocket 36b in gearing relation to drive chain 42. Drive chain 42 is in gearing relation to a sprocket 44 on a stub axle 46 of drive wheel 48, with stub axle 46 rotatably mounted to the corresponding side plate 14 of chassis 12 adjacent to back plate 26. It should then be appreciated that drive chains 20 and 42 are located intermediate side sheets 52 and side plates 14, and particularly are located exteriorly of tine housing 50.

Other means for operating the tine assembly in addition to or as an alternative to the drive chains can include a hydraulic motor that is coupled directly or indirectly to the tine assembly, such that the hydraulic motor itself powers the tine assembly. As another means for operating the tine assembly can include a belt, such as a v-belt, in place of the drive chains, in which case pulleys can be used in place of the sprockets. In each of these additional or alternative examples, the components may likewise be positioned where the drive chains are located, that is, exterior to the tine housing 50, so that each of the components can likewise be protected from the tine assemblies in operation. These alternative operational methods in which can operate the tine assemblies can also be utilized for the wheels as well, such that means for operating the wheels can likewise utilize a hydraulic motor or a v-belt with a pulley system. In this regard, the first and second driving means can be in fixed timing with each other such that the wheels and tine assemblies operate in tandem. The second drive can be positioned such that the second side support member is at least partially positioned between the tine assembly and the second drive.

Although the figures depict the tine assemblies 100 being mounted to the tine housing 50, which is distinct from the chassis 12, the tine housing 50 may alternatively be a single component with the chassis 12. For example, the tine assemblies 100 may be rotatably mounted to the chassis 12 itself. Furthermore, since the tine housing 50 can be formed as part of the chassis 12, any discussion of components with respect to the tine housing can be formed as the chassis as well, including the front and back sheets 56 and 58 and the side sheets 52. In this regard, the chassis can be formed of a pivoting portion of which is mounted to the tine assemblies and a fixed portion. Thus, the chassis itself may include the pivot in which case the tine assemblies and the pivoting portion of the chassis connected to the tine assemblies can pivot relative to the remainder of the chassis (e.g., the fixed portion) in accordance with the elongation and retraction of the hydraulic cylinder. Any discussion of tine housing 50 can alternatively be considered as being a discussion with respect to the chassis 12 itself, such as the pivoting portion of the chassis.

Chassis 12 further includes a console 16 shown as including a pair of side portions 62 secured to side plates 14 and upstanding therefrom. A top portion 64 extends between and is secured to the upper ends of side portions 62. A support shaft 66 extends between side portions 62 parallel to and spaced from top plate 28 and intermediate top portion 64 and tine housing 50.

Figure 4:
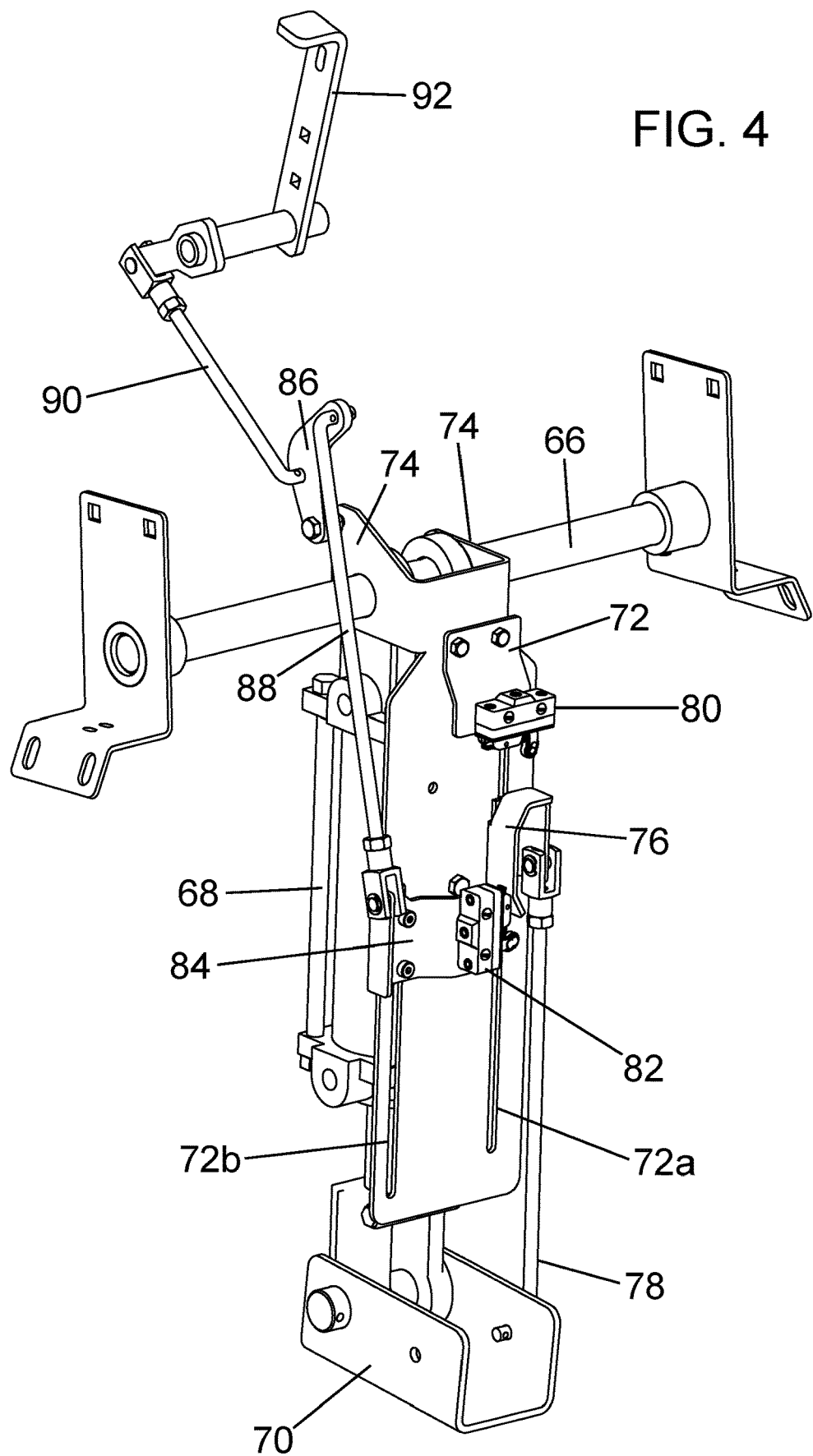
FIG. 4 shows a perspective view of other components of the aerating apparatus of FIG. 1.

Referring to FIG. 4, the upper end of a hydraulic cylinder 68 is pivotably connected to support shaft 66. The lower end of the hydraulic cylinder 68 is pivotably connected to a U-shaped bracket 70 secured to top sheet 60 of tine housing 50. Thus, by extending and retracting hydraulic cylinder 68, tine housing 50 and tine assemblies 100 therein are pivoted relative to chassis 12. As discussed above and in another example, if the chassis forms the components of the tine housing such that it is all a fluid piece or connection, then that portion of the chassis can move, or pivot, relative to the remainder of the fixed portion of the chassis based on the elongation and retraction of the hydraulic cylinder.

A bracket 72 is pivotably secured to support shaft 66 such as by extending support shaft 66 through a pair of ears 74 extending generally perpendicular to bracket 72 and located on opposite sides of the upper end of hydraulic cylinder 68. A trip 76 is movably mounted relative to a bracket 72 in a direction perpendicular to support shaft 66 and parallel to hydraulic cylinder 68, such as by having fasteners of trip 76 extend through an elongated slot 72a. The positions of trip 76 relative to bracket 72 correspond to the elongation or retraction of hydraulic cylinder 68, such as by a rod 78 having its upper end pivotably connected to trip 76 and its lower end pivotably connected to U-shaped bracket 70 and extending generally parallel to hydraulic cylinder 68.

For controlling the amount of retraction and elongation of hydraulic cylinder 68, a first switch 80 is suitably secured to an upper end of bracket 72, which is engageable by trip 76 to define the maximum retraction of hydraulic cylinder 68. A second switch 82 is mounted to bracket 72 for movement parallel to the movement of trip 76 relative to bracket 72, which is engageable by trip 76 to define the maximum elongation of hydraulic cylinder 68. In the form shown in FIG. 4, switch 82 is mounted to a bracket 84 having fasteners extending through an elongated slot 72b which is parallel to and spaced from slot 72a. For moving switch 82 relative to switch 80, a J-shaped crank arm 86 is pivotably mounted to one ear 74 at its first end. A slide rod 88 has its first end pivotably connected to a first end of crank arm 86 intermediate its ends and a second end pivotably connected to bracket 84. A handle rod 90 has a first end pivotably connected to a second end of crank arm 86 and a second end pivotably connected to a depth control lever 92 pivotably mounted in console 16 and extending outwardly of top portion 64.

Referring to FIG. 1, a switch 94 controls the retraction and elongation of hydraulic cylinder 68 between the extents defined by switches 80 and 82. In the form illustrated, switch 94 is located on an operator platform 96 mounted to chassis 12. In the form illustrated, operator platform 96 uses the rubber isolator mounting system disclosed in U.S. Pat. No. 8,632,018, which is hereby incorporated herein by reference. Also, operator platform 96 has a rubber mat 104 with holes in it to help with operator fatigue. Mat 104 can be flipped up for ease of cleaning dirt and debris that can accumulate while aerating. Operator platform 96 also has a lock 102 to keep it from accidentally flipping up with the user still on operator platform 96. The lock 102 can engage with a corresponding bore in the operator platform 96 which thereby prohibits the operator platform from moving. For example, when the operator platform is in use, that is, it extends parallel to the ground, the lock prohibits the operator platform from moving upwards in a closed position. Likewise, when the operator platform is positioned upward, or perpendicular to the ground, the lock can prohibit the operator platform from falling downward. Thus, the lock 102 can be disengaged to rotate operator platform 96 up and then, once the operator platform is in the up position, re-locked to hold it up. This aids in providing access to the user to the tine assemblies 100 in order to clean them.

Although switches and trips are shown in the figures and described, other electronic or mechanical mechanisms can also be implemented to serve a similar such purpose. Thus, the switch may be considered a variable position mechanism or device and the trip may be considered a triggering mechanism. For example, a magnetic pick-up sensor can be used to identify the presence of a magnet which may replace the trip. Other sensory devices can also be utilized such as a proximity sensory, and the like which can detect the approach of an object such as the trip. Furthermore, if sensors are utilized in which signals, such as digital signals, are ultimately transmitted to one or more processors (e.g., CPU), or otherwise a controller, micro-controller, etc., which can thereby control the operation of the hydraulic cylinder. In this regard, the turf aerator can include other components typically associated with computing devices in addition to the sensors and processors mentioned, such as memory configured to install data and instructions executable by the one or more processors, a display screen as an output mechanism, and an input mechanism for the user to control the turf aerator.

Figure 5:
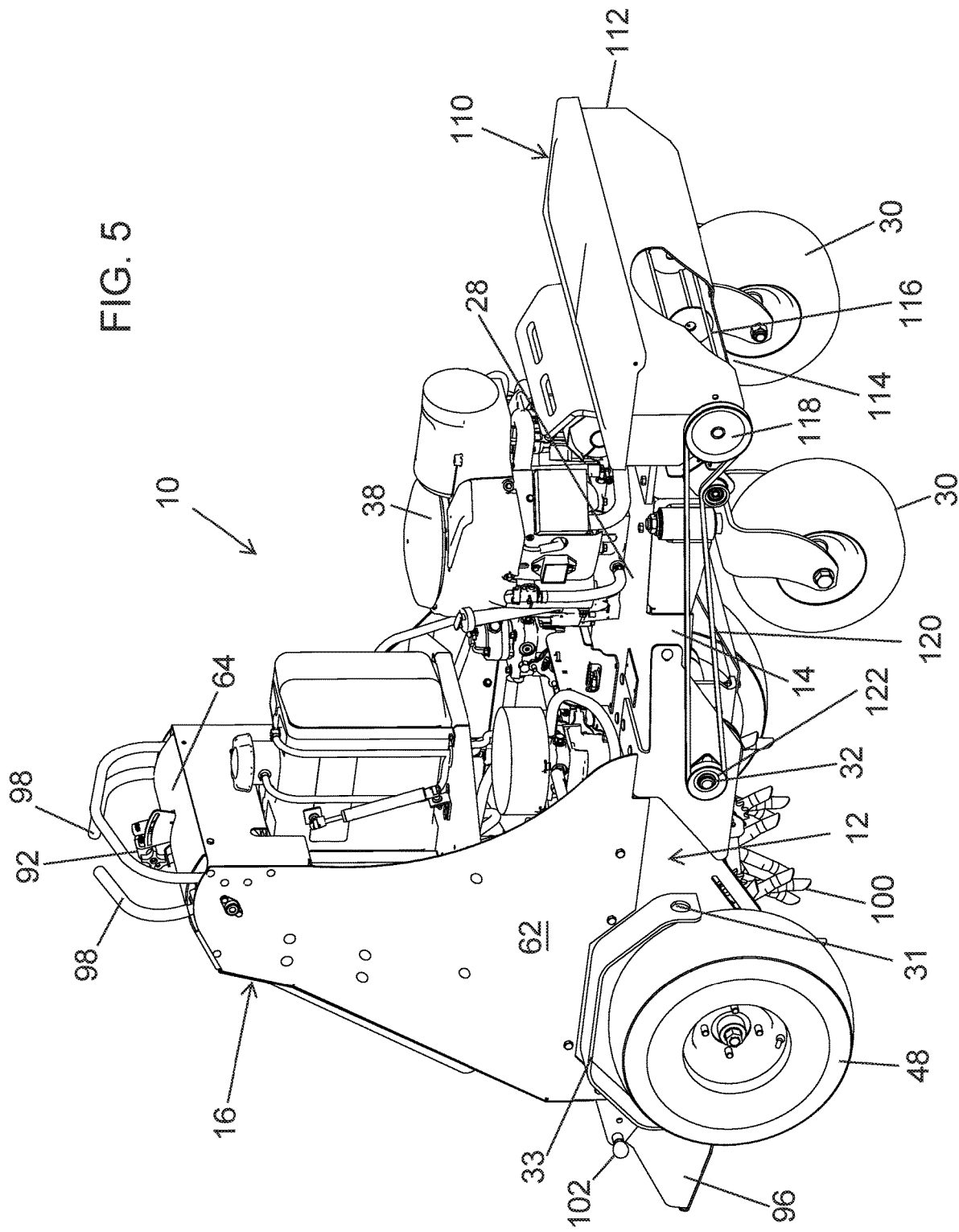
FIG. 5 shows a perspective view of the aerating apparatus of FIG. 1 including an attachment driven with the tine assembly and drive wheel.

Attachments such as drop seeder, drop spreader, or broadcast spreader can be installed on the front of the machine. In the illustrated form, an attachment 110 is suitably secured to front plate 24 and is powered by at least one hydraulic motor 34 with its corresponding tine assembly 100 and drive wheel 48. Attachment 110 is shown as being a drop seeder, but attachment 110 could be of other forms and types useful in turf management and, especially, in cooperation with aeration, including, but not limited to, a broadcast spreader, a drop spreader, or the like. FIG. 5 shows a drop seeder 112 that is powered by a v-belt 120 that is connected to hydraulic motor 34 by pulley 112. The agitator 116 in the seeder 112 runs proportionate to ground speed as the hydraulic motor also runs the wheels of the turf aerator.

In the form shown, attachment 110 includes a seeder 112 for holding seeds for dispensing out of an adjustable lower opening 114. In this regard, controls for adjusting lower opening 114 could be routed up to console 16 which the operator could easily reach during operation. The agitator 116 is provided inside of seeder 112 having a pulley 118 exterior of seeder 112. Pulley 118 and agitator 116 are shown as being powered by the belt 120, which in this example is a v-belt, extending between pulley 118 and a pulley 122 provided on output shaft 32 outwardly of side plate 14. Although only shown as being driven by one hydraulic motor 34 with one drive wheel 48 and one tine assembly 100, attachment 110 could also been powered by the other hydraulic motor 34 with the other drive wheel 48 and the other tine assembly 100.

Turf aerator 10 eliminates the need for the user to have to adjust hydraulic pressure, by instead having the user set a desired depth and automatically adjusting hydraulic pressure to produce the correct down pressure. The depth will stay consistent and does not require constant adjustment by the user. The only condition where the depth will be less than set is when the soil is too hard and the down pressure required for that depth is more than the maximum created by the weight of turf aerator 10. In this case, tine assemblies 100 will not penetrate to the depth selected. This is the same as conventional machines when they are at their maximum hydraulic pressure. To engage tine assemblies 100 in the ground, the user steps on switch 94 on operator platform 96 and keeps switch 94 down. To disengage tine assemblies 100, the user steps off switch 94.

Turf aerator 10 allows the user to set a fixed depth by having depth control lever 92 that is infinitely variable to set depth. That is, infinitely variable may be defined between the two points in which the depth control lever can extend. Thus, the user can adjust the depth control lever at any location between which the lever operates, such as may be defined by the top portion 64. There are two switches 80 and 82, one for the raised position (remains fixed) and one for the lowered position (variable and is attached by linkage to depth control lever 92). As depth control lever 92 is moved forward or backward, it increases or decreases the tine depth by moving switch 82 down or up. Trip 76 is moveably attached to tine housing 50, which trips either raised position switch 80 or lowered position switch 82. When the user is not standing on foot switch 94, the manifold allows hydraulic cylinder 68 to retract, lifting tine assemblies 100 out of the ground. Hydraulic cylinder 68 retracts until trip 76 trips raised position switch 80. When the user stands on foot switch 94, the manifold forces hydraulic cylinder 68 to extend until trip 76 trips lowered position switch 82. Turf aerator 10 also allows the user to easily set different depths for different lawns based on customer preference, without having to make a few passes to gauge soil conditions. As an alternative embodiment, both the first and second switches can be variable, that is, adjustable by the user using depth control levers or other adjustable mechanisms.

Additionally, turf aerator 10 has tine housing 50 shielding tine assemblies 100 attached to the tine shaft, so the whole assembly raises and lowers. Since it is all independent of chassis 12, turf aerator 10 allows drive chains 20 and 42 to be on the outside of tine housing 50, which shields drive chains 20 and 42 from the dirt and debris of aerating. This improves chain life and creates less down time for the user. Turf aerator 10 also minimizes the number of chains and belts, with only one belt to run the hydraulic pumps and four drive chains 20 and 42 running off hydraulic motors 34 to run each wheel 48 and each tine assembly 100. Also, the belt has a spring tensioner to help take up slack in the belt as it stretches with wear.

To operate turf aerator 10, the user presses forward on handles 98, which operates hydraulic motors 34, to go forward; pulls back on handles 98, which operates hydraulic motors 34, to go in reverse; presses forward on left handle 98 farther than the right handle 98, which operates hydraulic motors 34, to turn right; and presses forward on the right handle 98 farther than the left handle 98, which operates hydraulic motors 34, to turn left. This is similar to zero turn radius machines.

Thus, since the invention disclosed herein may be embodied in other specific forms without departing from the spirit or general characteristics thereof, some of which forms have been indicated, the embodiments described herein are to be considered in all respects illustrative and not restrictive.

The invention claimed is:

1. A turf aerator comprising:
   a chassis having two side plates, front and back plates integrally extending between the two side plates and an opening, with the opening being at least partially between the two side plates and between the front and back plates of the chassis;
   drive wheels rotatably mounted to the chassis and located adjacent to the back plate on opposite sides of the two side plates;
   a support wheel secured to the chassis adjacent to the front plate and spaced in a direction parallel to each of the two side plates from the drive wheels, with the drive wheels and the support wheel movably supporting the chassis;
   a tine assembly support structure independently movably secured to the chassis and extending at least partially within the opening of the chassis, with the tine assembly support structure comprising:
   a top support member;
   a first side support member positioned at a first end of the top support member; and
   a second side support member positioned at a second end opposite the first end of the top support member; and
   a tine assembly rotatably mounted to the tine assembly support structure and positioned between the first and second side support members, with the tine assembly support structure and the tine assembly independently moving relative to the chassis.

2. The turf aerator of claim 1, further comprising a first drive which drives the tine assembly, wherein the first drive is positioned intermediate one of the two side plates and the second side support member, thereby blocking debris picked up by the tine assembly during operation.

3. The turf aerator of claim 1, further consisting of a single belt utilized to operate with an engine and hydraulic pumps in operating the turf aerator.

4. The turf aerator of claim 1, further comprising:
   at least one hydraulic motor mounted to the chassis;
   an attachment including any one or more of a drop seeder, a broadcast spreader, or a drop spreader; and
   means for removably securing the attachment to a portion of the chassis, wherein the attachment is powered by the at least one hydraulic motor which makes the attachment run at a speed that is dependent on and corresponds with ground speed movement of the turf aerator, and wherein the tine assembly support structure is independently movable relative to the attachment secured to the chassis.

5. The turf aerator of claim 1, wherein the tine assembly support structure is pivotally secured to the chassis intermediate and spaced from the drive wheels and the support wheel in the direction parallel to each of the two side plates.

6. The turf aerator of claim 5, further comprising a hydraulic cylinder extending between the chassis and the tine assembly support structure and with elongation and retraction of the hydraulic cylinder causing the independently moving tine assembly support structure to pivot at the chassis according to the elongation and the retraction of the hydraulic cylinder.

7. A turf aerator comprising:
a chassis having two side plates and an opening, with the opening being at least partially between the two side plates of the chassis;
drive wheels located on opposite sides of the two side plates;
a support wheel secured to the chassis adjacent to the front plate and spaced in a direction parallel to each of the two side plates from the drive wheels, with the drive wheels and the support wheel movably supporting the chassis;
a tine assembly support structure independently movably secured to the chassis and extending at least partially within the opening of the chassis, with the tine assembly support structure comprising:
a top support member;
a first side support member positioned at a first end of the top support member; and
a second side support member positioned at a second end opposite the first end of the top support member;
a tine assembly rotatably mounted to the tine assembly support structure and positioned between the first and second side support members, with the tine assembly support structure and the tine assembly independently moving relative to the chassis; and
a second drive which drives the drive wheels for the chassis of the turf aerator, wherein the second drive is positioned such that the second side support member is at least partially positioned between the tine assembly and the second drive, and wherein the first and second drives are of fixed timing with one another.

8. A turf aerator comprising:
a chassis having two side plates and an opening, with the opening being at least partially between the two side plates of the chassis;
drive wheels located on opposite sides of the two side plates;
a support wheel secured to the chassis adjacent to the front plate and spaced in a direction parallel to each of the two side plates from the drive wheels, with the drive wheels and the support wheel movably supporting the chassis;
a tine assembly support structure independently movably secured to the chassis and extending at least partially within the opening of the chassis, with the tine assembly support structure comprising:
a top support member;
a first side support member positioned at a first end of the top support member; and
a second side support member positioned at a second end opposite the first end of the top support member;
a console that includes various controls to operate the turf aerator, wherein the console further includes a depth control lever pivotally mounted in the console and configured to be infinitely variable in setting a desired turf penetration depth for the tine assembly;
a variable position mechanism connected to and movable with one of the depth control lever and the tine assembly support structure; and
a triggering mechanism connected to and movable with another of the depth control lever and the tine assembly support structure, with the triggering mechanism engageable with the variable position mechanism to define the desired turf penetration depth for the tine assembly.

9. The turf aerator of claim 8, further comprising:
a crank arm connected to the depth control lever; and
a slide rod that at one end is pivotally connected to the crank arm and at a second end is connected to the variable positioning mechanism, with the triggering mechanism fastened to the tine assembly support structure defining the desired turf penetration depth for the tine assembly, wherein movement of the depth control lever translates to movement of the variable positioning mechanism.

10. The turf aerator of claim 9, further comprising:
a first bracket pivotally secured to the chassis; and
a second bracket slideably mounted to the first bracket, with the variable position mechanism secured to and movable with the second bracket, with the trigger mechanism slideably mounted to the first bracket.

11. The turf aerator of claim 10, further comprising: a fixed position switch secured to and movable with the first bracket, with the triggering mechanism engageable with the fixed position switch and defining an extent of movement of the tine assembly support structure relative to the chassis.

12. A turf aerator comprising:
a chassis having two side plates and an opening, with the opening being at least partially between the two side plates of the chassis;
drive wheels located on opposite sides of the two side plates;
a support wheel secured to the chassis adjacent to the front plate and spaced in a direction parallel to each of the two side plates from the drive wheels, with the drive wheels and the support wheel movably supporting the chassis;
a tine assembly support structure independently movably secured to the chassis and extending at least partially within the opening of the chassis, with the tine assembly support structure comprising:
a top support member;
a first side support member positioned at a first end of the top support member; and
a second side support member positioned at a second end opposite the first end of the top support member;
at least one hydraulic motor mounted to the chassis;
an attachment including any one or more of a drop seeder, a broadcast spreader, or a drop spreader; and
means for removably securing the attachment to a portion of the chassis, wherein the attachment is powered by the at least one hydraulic motor which makes the attachment run at a speed that is dependent on and corresponds with ground speed movement of the turf aerator, and wherein the tine assembly support structure is independently movable relative to the attachment secured to the chassis, and wherein the removably securing means comprises, in combination: a front attachment receiver extending through the front plate and extending parallel to and intermediate the two side plates; and attachment holes located in the front plate on opposite sides of the front attachment receiver and configured to receive a portion of the attachment.

13. The turf aerator of claim 12, further comprising side fenders fixed to the two side plates and extending over the drive wheels, with the side fenders including incorporated tie down holes configured for securing the turf aerator during transport and with the attachment holes configured for securing the turf aerator.

* * * * *